(No Model.)
J. L. JOHNSON.
METALLIC FASTENER FOR PNEUMATIC TIRES.
No. 545,506. Patented Sept. 3, 1895.
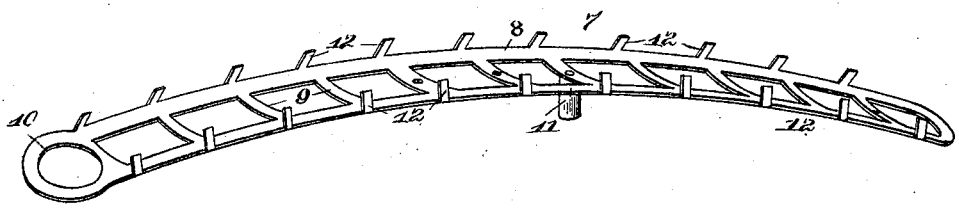
Fig. 1.
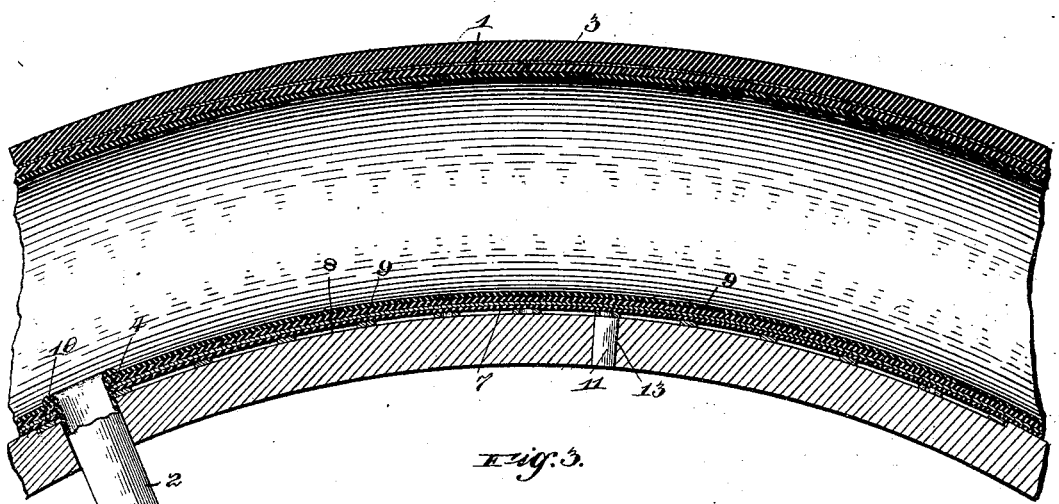
Fig. 2.
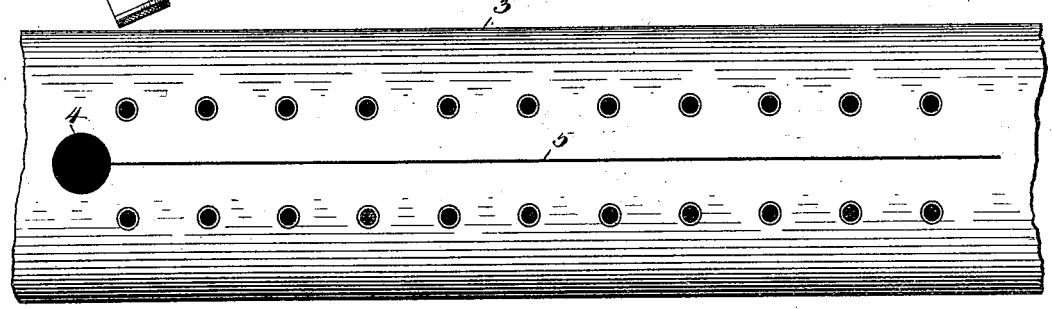
Fig. 3.
Fig. 4.
Witnesses
W. T. Doyle.
R. M. Smith.
Inventor
James L. Johnson.
By his Attorneys,
C. A. Snow & Co.

UNITED STATES PATENT OFFICE.

JAMES L. JOHNSON, OF FORT MADISON, IOWA.

METALLIC FASTENER FOR PNEUMATIC TIRES.

SPECIFICATION forming part of Letters Patent No. 545,506, dated September 3, 1895.

Application filed February 23, 1895. Serial No. 539,409. (No model.)

*To all whom it may concern:*

Be it known that I, JAMES L. JOHNSON, a citizen of the United States, residing at Fort Madison, in the county of Lee and State of Iowa, have invented a new and useful Metallic Fastener for Pneumatic Tires, of which the following is a specification.

My invention relates to an improved device for fastening rubber tires at the slit formed in the inner wall or face of the outer cover or casing.

The object of my invention is to do away with the tedious process of "lacing" the outer casing of pneumatic tires after the inner tube has been inserted preparatory to placing the tire in the rim and inflating it.

My invention consists in providing a curved plate, preferably in the form of an open-work or skeleton frame, which has upon either edge a row or series of hooks or pins corresponding in position and number to the lace-holes in the contiguous edges upon opposite sides of the slit in the outer cover or casing; also in providing said plate or fastener with a perforation for striding the valve of the inner tube where it passes through the outer casing, and in further providing the plate or fastener with a pin or stud, which passes through a hole in the rim of the wheel and serves to prevent "creeping" of the tire and the consequent abrasion of and injury to the valve; also in certain details of construction and arrangement of parts hereinafter specifically described, and pointed out in the claim.

In the accompanying drawings, Figure 1 is a perspective view of my improved metallic fastener for pneumatic tires. Fig. 2 is a vertical section through the tire, showing the application of my improved fastener. Fig. 3 is a plan view of the inner face of the outer cover or case, showing the arrangement of the lace-holes, the intervening slit, and the valve. Fig. 4 is a vertical section through the inner tube, outer cover, fastener, and wheel-rim.

Similar numerals of reference indicate corresponding parts in the figures of the drawings.

Referring to the drawings, 1 indicates the inner tube, which is made in the usual manner from soft rubber and provided with a valve 2, of any ordinary or preferred construction.

3 indicates the outer case or cover, composed of rubber, canvas, &c., and made much heavier than the inner tube. This outer cover is provided with a perforation 4 in its inner wall, through which the valve 2 of the inner tube 1 is adapted to pass. A slit 5 extends from said perforation 4 for a considerable distance along the inner face of the outer case and centrally thereof, and upon either side of said slit a row or series of perforations or eyelet-holes are provided, which in the ordinary construction of tires are adapted to receive a lace or cord for securing the contiguous edges on either side of the slit 5 together.

7 indicates my improved fastening device, which is shown made, preferably, in open-work or skeleton form—that is, composed of two long side strips 8 connected at intervals by cross-bars 9—and said plate is provided at one end with a circular opening 10 for the passage of the valve and at intermediate points with several small perforations adapted to receive a pin or spur 11, the position of which may be varied by inserting it in either one of said small perforations for a purpose which will appear. The pin 11 projects from the concave face of the fastening-plate, and from the opposite or convex face thereof two rows or series of pins or hooks 12 are provided, corresponding in position and number to the eyelet-holes in the outer case or cover 3 of the tire, the said hooks or pins being given a slight inward bend or inclination for more thoroughly engaging the eyelet-holes and securing the contiguous edges on opposite sides of the slit 5 in the outer case together.

The inner tube 1 having been inserted through the slit 5 and passed around through the outer case and the valve 2 having been passed through the perforation 4, the fastener 7 is applied exteriorly to the outer case by slipping the perforated end 10 over the valve 2 and passing the pins or hooks 12 through the eyelet-holes in the outer case, the latter by their inward inclination holding the fastener in place while the tire is being placed in the rim. In placing the tire in the rim the pin 11 passes down through a perforation 13 in said rim and the valve 2 through an opening in the rim in the usual manner. By means of the engagement of the pin 11 with the rim of the wheel the tire is prevented from creeping, and the perforated end 10 of the metallic fastener serves to thoroughly support the valve 2 and prevent abrasion of and injury to the same. The purpose of providing several perforations in the fastener for the pin 11 is to enable the position of said pin to be regulated so that the pin may pass through the rim at a point intermediate two of the spokes. It will be apparent that by reason of the fastener being interposed between the outer case of the tire and the rim when the tire is inflated said fastener will be held closely to its engagement with said outer case at all points. The fastener may be applied to and removed from the outer case with great ease and rapidity.

Having thus described my invention, what I claim is—

A metallic fastening device for the outer case or cover of a pneumatic tire, made from a single sheet metal blank shaped to conform to the curvature of the exterior surface of the tire and comprising a longitudinally extending plate, two rows of oppositely disposed and inwardly converging pins or hooks projecting from the convex face thereof and formed integrally with the edges of said plate and adapted to engage eyelet holes in the outer case or cover of the tire, and an integral loop at one end of said plate for embracing and supporting the valve, the whole device being formed of a single piece of metal and adapted to be applied to the exterior surface of said outer case or cover and between the latter and the wheel rim, substantially in the manner and for the purpose specified.

In testimony that I claim the foregoing as my own I have hereto affixed my signature in the presence of two witnesses.

JAMES L. JOHNSON.

Witnesses:
OMAR E. HERMINGHAUSEN,
O. C. HERMINGHAUSEN.